No. 792,191. PATENTED JUNE 13, 1905.
B. J. BLAMEUSER.
GALVANIC BATTERY.
APPLICATION FILED AUG. 1, 1904.
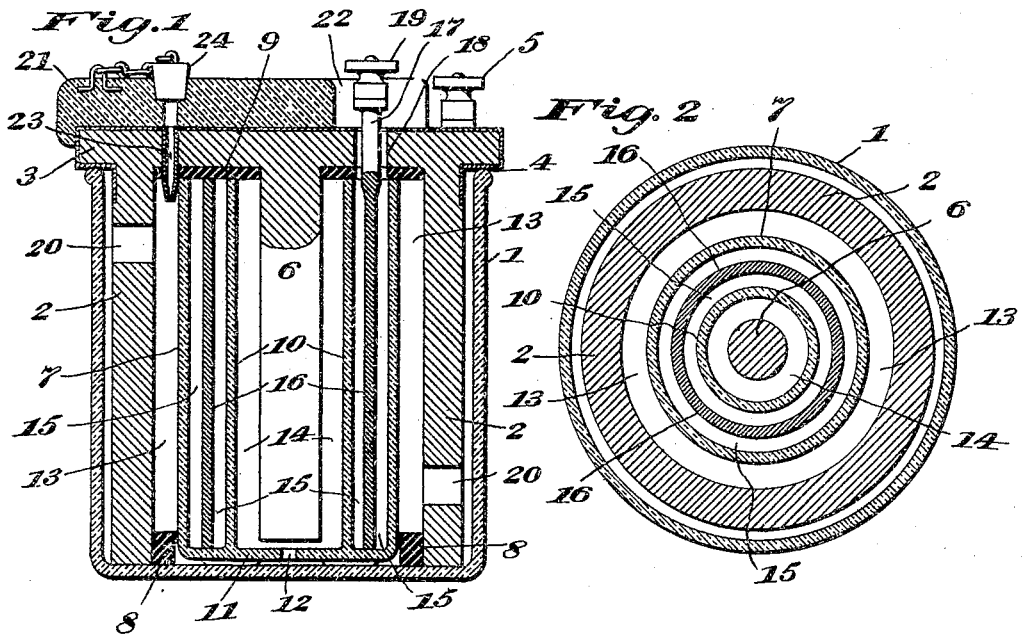
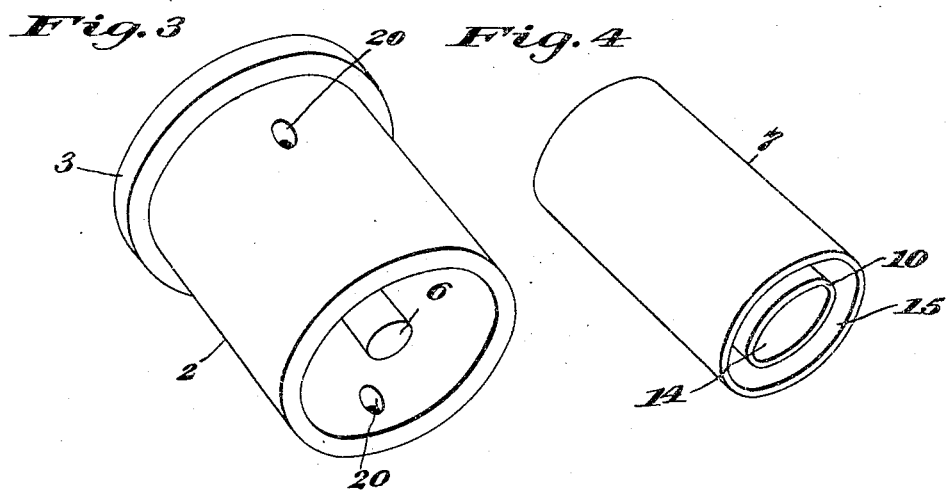
Witnesses
J. H. Cashlegn
A. Gustafson
Inventor
Benjamin J. Blameuser.
By Chas. C. Tillman
Attorney No. 792,191.

Patented June 13, 1905.

UNITED STATES PATENT OFFICE.

BENJAMIN J. BLAMEUSER, OF CHICAGO, ILLINOIS.

GALVANIC BATTERY.

SPECIFICATION forming part of Letters Patent No. 792,191, dated June 13, 1905.

Application filed August 1, 1904. Serial No. 218,985.

*To all whom it may concern:*

Be it known that I, BENJAMIN J. BLAMEUSER, a citizen of the United States, residing at Chicago, in the county of Cook and State of Illinois, have invented certain Improvements in Galvanic Batteries, of which the following is a specification.

This invention relates to certain improvements in galvanic batteries, and has for its object to provide a battery of a simple and inexpensive nature and of a compact and improved construction such as to adapt it for the generation of a current of sustained voltage and for constant operation throughout an increased interval of time.

The invention consists in certain novel features of the construction and combinations and arrangements of the several parts of the improved galvanic battery whereby certain important advantages are attained and the device is made simpler, cheaper, and otherwise better adapted and more convenient for use than various other forms of battery heretofore devised, all as will be hereinafter fully set forth.

The novel features of the invention will be carefully defined in the claims.

In the accompanying drawings, which serve to illustrate my invention, Figure 1 is a section taken axially through a galvanic cell embodying my invention, and Fig. 2 is a sectional view taken transversely through the same. Fig. 3 is a perspective view showing the positive-pole electrode of the cell detached, and Fig. 4 is a perspective view showing the porous cup of the cell also detached.

In the views, 1 indicates a jar or container, of glass or other material, in which are arranged the positive and negative pole elements, together with the solutions of the improved cell. The elements are formed from carbon and zinc cylinders by preference, and these are arranged one within the other in a well-known way. Between the positive and negative pole elements is arranged a porous partition or diaphragm by means of which the space intervening between the elements is divided into two chambers or compartments, in one of which is adapted to be received the active solution, which is preferably formed from sulfuric acid and to the action of which the zinc element is exposed, the other chamber or compartment being adapted to receive a supply of some suitable depolarizing agent—as, for example, a bichromate-of-potash solution—which is thereby interposed in the path of the current and is adapted to take up the hydrogen and prevent polarization of the cell in the ordinary way.

The positive-pole electrode of the improved cell is formed, as clearly shown in the drawings, with an outer shell 2 of hollow rounded form and of a diameter adapted to fit loosely within the jar or container 1, said shell 2 being open at its base, but having its upper part closed and covered over by means of a flattened top plate or portion 3, integrally formed upon it, with edge portions which project and form an annular flange extended around the upper part of the element and adapted to rest upon the upper edge of the jar or container 1, so as to produce a close joint between the parts.

Upon the flattened top plate or portion 3 of the carbon element is arranged in an ordinary way a binding-post 5, adapted for connection with a circuit-conductor, and to insure proper electrical communication of the binding-post with said carbon element the upper part of said element at which the binding-post is arranged is electroplated with copper to produce a conductive coating 4 of that metal to promote electrical communication with the binding-post, which coating is afterward amalgamated for protection against corrosion. After such amalgamation the upper part of the element is coated over or saturated upon its inner surfaces with paraffin, and finally the outer sufrace of the plated upper portion of the element is covered over with some suitable acid-proof substance. In this way the copper plate upon the upper part of the element is protected against the action of the fumes arising during the operation of the cell, and said fumes are prevented from escaping at the top of the cell, which is rendered impervious to them by the treatment above recited.

At the central part of the flattened top plate or portion 3 of the carbon element is arranged a cylindrical rod or part 6, integral with said top plate or portion and extended down axially within the space or hollow inside the shell 2, being of such diameter as to afford between it and the inner surface of said shell 2 an annular space or chamber wherein is arranged the zinc or negative-pole electrode, together with the porous cup or partition and the electrolytic and depolarizing solutions. The porous cup or partition is formed with double walls of concentric rounded form in cross-section, and said cup has its outer wall 7 made in less diameter than the inside diameter of the shell 2 of the carbon element, whereby an annular space or chamber 13 is produced between these parts when the cup is in position within said shell 2, a ring or gasket 8, of acid-proof substance, being arranged between said outer wall 7 of the porous cup and the shell 2 of the carbon element at the base of said chamber 13 to hold the parts in relation. 9 indicates a similar acid-proof gasket or washer arranged upon the under side of the flattened top plate or portion 3 of the carbon element within the space intervening between the shell 2 and the rod 6, the under side of said gasket or washer 9 being adapted for close contact upon the upper edge of said outer wall 7 of the porous cup and also upon the upper edge of the inner wall 10 of said cup in such a way as to produce a tight joint between the top plate or portion 3 and the porous cup for holding the cup in position within the shell 2. The outer and inner walls 7 and 10 of the porous cup are spaced apart to produce between them an annular chamber 15, wherein is arranged the zinc element 16 of the cell, the chamber 15 being open at its top to receive said element 16, but having its lower part closed by the imperforate outer portion of the bottom 11 of said cup. The internal diameter of the inner wall 10 of the porous cup is of greater diameter than the central rod or extension 6 of the carbon element of the cell, whereby an annular space or chamber 14 is produced between said wall 10 and the rod or extension 6. The bottom 11 of the porous cup is formed on its under side with projections, as shown in Fig. 1, whereby its under surface is elevated above the bottom of the jar or container 1, and said bottom 11 has a central opening 12 produced within it and affording communication, in connection with the space beneath the bottom of the cup, between the central chamber 14 within the inner wall 10 of the cup and the chamber 13 between the outer wall 7 of said cup and the shell 2 of the carbon element, the bottom or lower end of the rod or extension 6 of the carbon element being, as shown, located at such an elevation above the perforated bottom of the porous cup as not to interfere with the flow of fluid through said opening 12.

The zinc element 16 is made in tubular rounded form and of a diameter adapted to permit of a central arrangement in the space or chamber 15 between the inner and outer walls of the porous cup, whereby the opposite sides of said element 16 are exposed to the action of the electrolyte contained in said chamber, the element being held in position by engagement of the gasket or washer 9 upon its upper surface. This element 16 is also provided at one side with an upwardly-extended portion 17, which is passed through openings in gasket 9 and in the overlying top plate 3 of the carbon element and carries above said element a binding-screw 19, adapted for connection with the other circuit-terminal.

18 indicates the opening in top plate 3, which is made so large as to prevent contact of the part 17 upon the surface of the top plate and may receive insulating material, if desired.

21 indicates a cap or cover plate formed of any desired material and extended over the top plate 3 of the carbon element, with an edge portion or flange extended down around the same for holding said cap or cover plate in position, one side of the cap or cover being recessed or cut out, as indicated at 22, to afford space in which are arranged the binding-screws 5 and 19. The cap or cover is also provided with a filling device comprising a tube 23, the upper end of which is arranged to open at the top of said cap or cover and is adapted to be closed by means of a stopper 24 and the lower end of which is arranged to extend down through the top plate or portion 3 of the carbon element and to project below the same into the outer chamber or space 13 between the shell 2 and the outer wall 7 of the porous cup. When the stopper 24 is removed, the tube 23 may be employed for supplying liquid to said space or chamber 13, and when the stopper is in place the tube is closed to prevent the escape of fumes from within the cell.

The space or chamber 15 within the porous cup is designed to receive the active solution, which is adapted to operate upon the inner and outer surfaces of the zinc element within said chamber, and the chamber 13 outside of the porous cup is adapted to receive a supply of some suitable depolarizing solution which will flow also into the inner chamber 14 of the cup within which the rod or extension 6 of the carbon element is immersed by way of the space beneath the bottom 11 of the cup and the opening 12 in said bottom. The air at the upper part of the chamber 14 may be permitted to escape through opening 18 by slightly raising or lifting the carbon element so as to break the joint between the porous cup and gasket 9. The carbon element has its shell 2 also provided with openings 20, suitably arranged to permit the entry of the solution into the chamber 13 from the space between shell 2 and the jar or container 1.

By this construction it will be evident that the carbon element is, in effect, provided with two electrodes, one of these being the shell 2 and the other the rod or extension 6, and the opposite inner and outer surfaces of the zinc element also form, in effect, two electrodes, each of which is adapted to act in conjunction with a portion of the active solution in the chamber 15 and with one of the carbon electrodes for the generation of electricity. The chambers 14 and 13 inside the inner wall and outside the outer wall of the porous cup, respectively, act to present in the path of the current flowing between each set of electrodes a stratum of the depolarizing solution which is adapted to act by taking up the evolved hydrogen to prevent polarization of the carbon electrodes and promote constancy of the generated current. It will also be evident that since the opposite surfaces of the zinc element are similarly exposed to the action of the electrolyte in chamber 15 and since the resistance of the current flowing therefrom to each carbon electrode is substantially equal a more complete action is effected, so that a sustained voltage of the generated current is afforded.

Since the efficiency of the depolarizing solution in chambers 13 and 14 will be lessened gradually during the operation of the cell, it will be desirable at times to replenish said solution, so as to afford greater constancy of the current, and this may be readily accomplished by removing the stopper 24 and pouring the fresh solution through the tube 23 in such quantities as may be necessary from time to time.

The improved galvanic cell constructed according to my invention is of an extremely simple and inexpensive nature and is especially well adapted for use by reason of the sustained voltage of the current generated by it and also of the greater constancy of the generated current, and it will also be obvious from the above description that the device is capable of considerable change without material departure from the principles and spirit of the invention, and for this reason I do not wish to be understood as limiting myself to the precise form and arrangement of the several parts of the improved cell herein set forth in carrying out my invention in practice. For example, if desired, the elements may be made in elliptical or rectangular form in cross-section instead of being made annular, as herein.

Having thus described my invention, what I claim, and desire to secure by Letters Patent, is—

1. A galvanic battery comprising elements one of which is provided with a shell and a rod axial in the shell but spaced therefrom, and the other of which is a cylinder inclosing the rod within said space between the rod and shell, and a porous cup having inner and outer walls spaced apart to produce a chamber within which the cylindrical element is held.

2. A galvanic battery comprising a positive-pole electrode comprising a shell and a rod axial in the shell but spaced therefrom, a negative-pole electrode inclosing the rod within said space between the rod and shell and a porous cup having inner and outer walls spaced apart to produce a chamber within which the negative-pole electrode is held.

3. A galvanic battery comprising positive-pole electrode having a shell and provided with a rod axial therein but spaced therefrom, a negative-pole electrode in tubular form inclosing said rod in the space between the rod and shell and a porous cup having double walls spaced apart to produce a chamber to receive the negative-pole electrode, the walls of said cup being also spaced apart from the shell and rod, respectively, of the positive-pole electrode to produce interposed chambers adapted to receive depolarizing substance.

4. A galvanic battery comprising a positive-pole electrode having a shell and provided with a rod axial therein but spaced therefrom, a negative-pole electrode in tubular form inclosing said rod in the space between the rod and shell and a porous cup having double walls spaced apart to produce a chamber to receive the negative-pole electrode, the walls of said cup being also spaced apart from the shell and rod, respectively, of the positive-pole electrode to produce interposed chambers to receive depolarizing substance and the bottom of said porous cup having an opening adapted for communication between said inner and outer chambers.

5. A galvanic cell comprising a positive-pole electrode having a shell, a top plate and a rod on the top plate and extended axially within but spaced apart from the shell, negative-pole electrode in tubular form inclosing said rod in the space between the rod and shell, a porous cup having double walls spaced apart to produce a chamber to receive the negative-pole electrode, the walls of the cup being also spaced apart from the shell and rod, respectively, of the positive-pole electrode to produce outer and inner interposed chambers adapted to receive depolarizing substance and said inner and outer chambers being adapted for communication one with the other and a filling-tube extended down through the top plate into one of said chambers for the supply of depolarizing substance thereto.

BENJAMIN J. BLAMEUSER.

Witnesses:
CHAS. C. TILLMAN,
A. GUSTAFSON.